United States Patent

[11] 3,590,422

| [72] | Inventors | Edward Andrew Matecki<br>Evergreen Park;<br>Verner Edwin Pearson, Oak Lawn, both of, Ill. |
|---|---|---|
| [21] | Appl. No. | 797,419 |
| [22] | Filed | Feb. 7, 1969 |
| [45] | Patented | July 6, 1971 |
| [73] | Assignee | Union Carbide Corporation<br>New York, N.Y. |

[54] METHOD AND APPARATUS FOR PROVIDING CONSTANT INFLATION AIR
4 Claims, 8 Drawing Figs.

[52] U.S. Cl. .................................................. 17/42, 17/49
[51] Int. Cl. .................................................. A22c 11/02
[50] Field of Search ........................................ 17/42, 49

[56] References Cited
UNITED STATES PATENTS

| 3,110,058 | 11/1963 | Marbach | 17/42 |
| 3,112,517 | 12/1963 | Ives | 17/42 |
| 3,315,300 | 4/1967 | Ziocko | 17/42 |

*Primary Examiner*—Lucie H. Laudenslager
*Attorneys*—Paul A. Rose, John F. Hohmann and Franklyn Schoenberg ABSTRACT: The shirring mandrel of a shirring apparatus is provided with ports and is adapted to house within its bore a reciprocating valve assembly which serves to alternately open and close the mandrel ports thereby permitting inflation air to be constantly supplied to and through the mandrel ports to and through the mandrel bore without interruption.

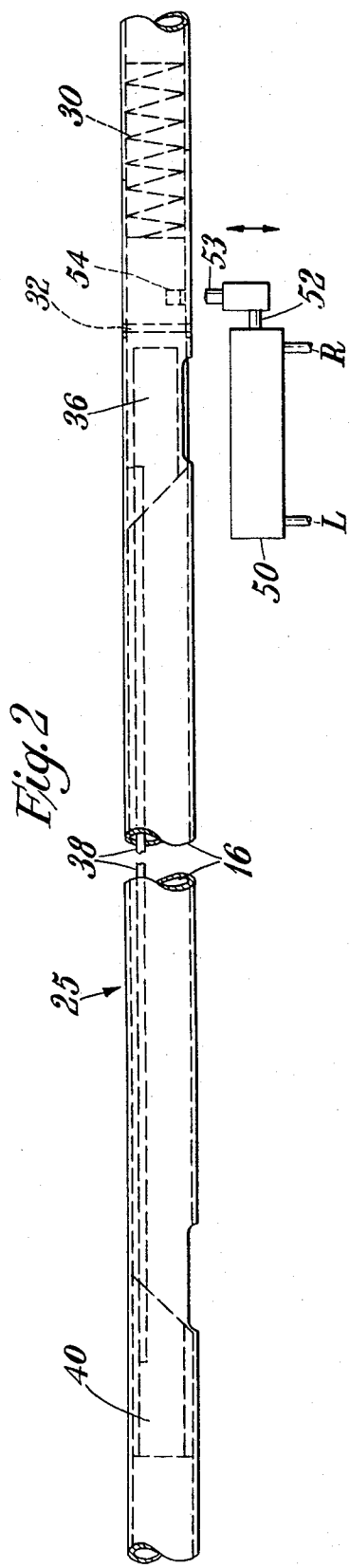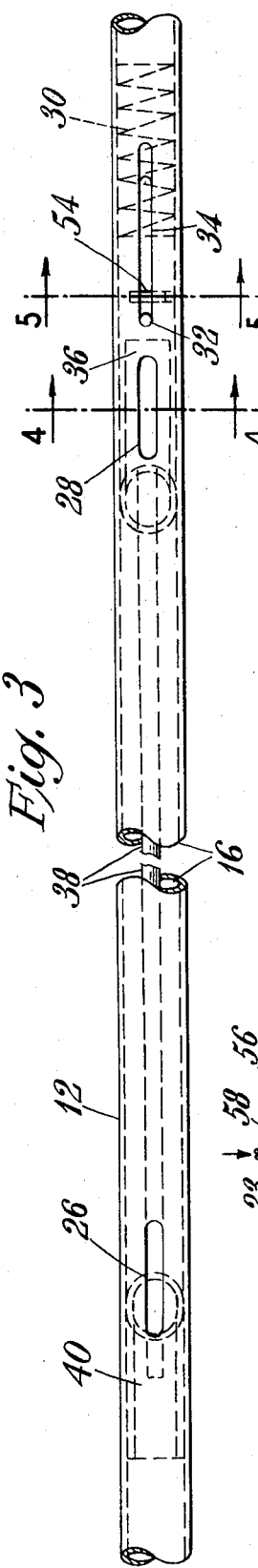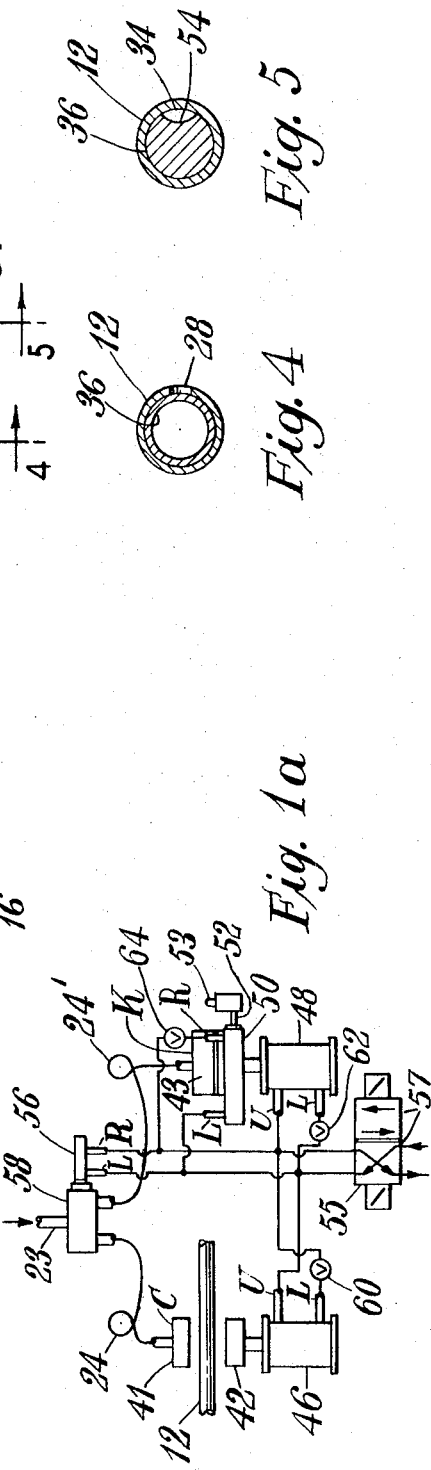

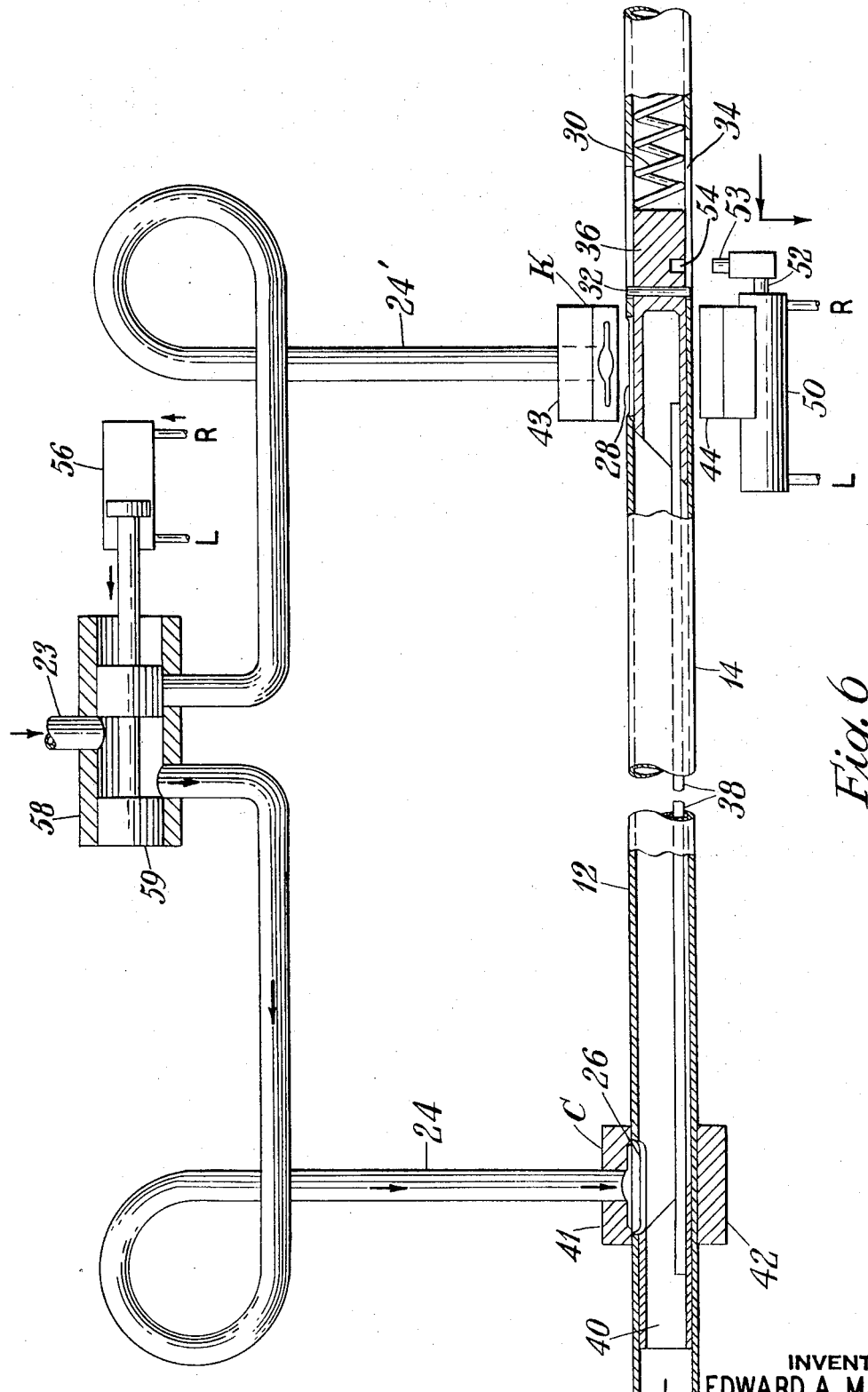

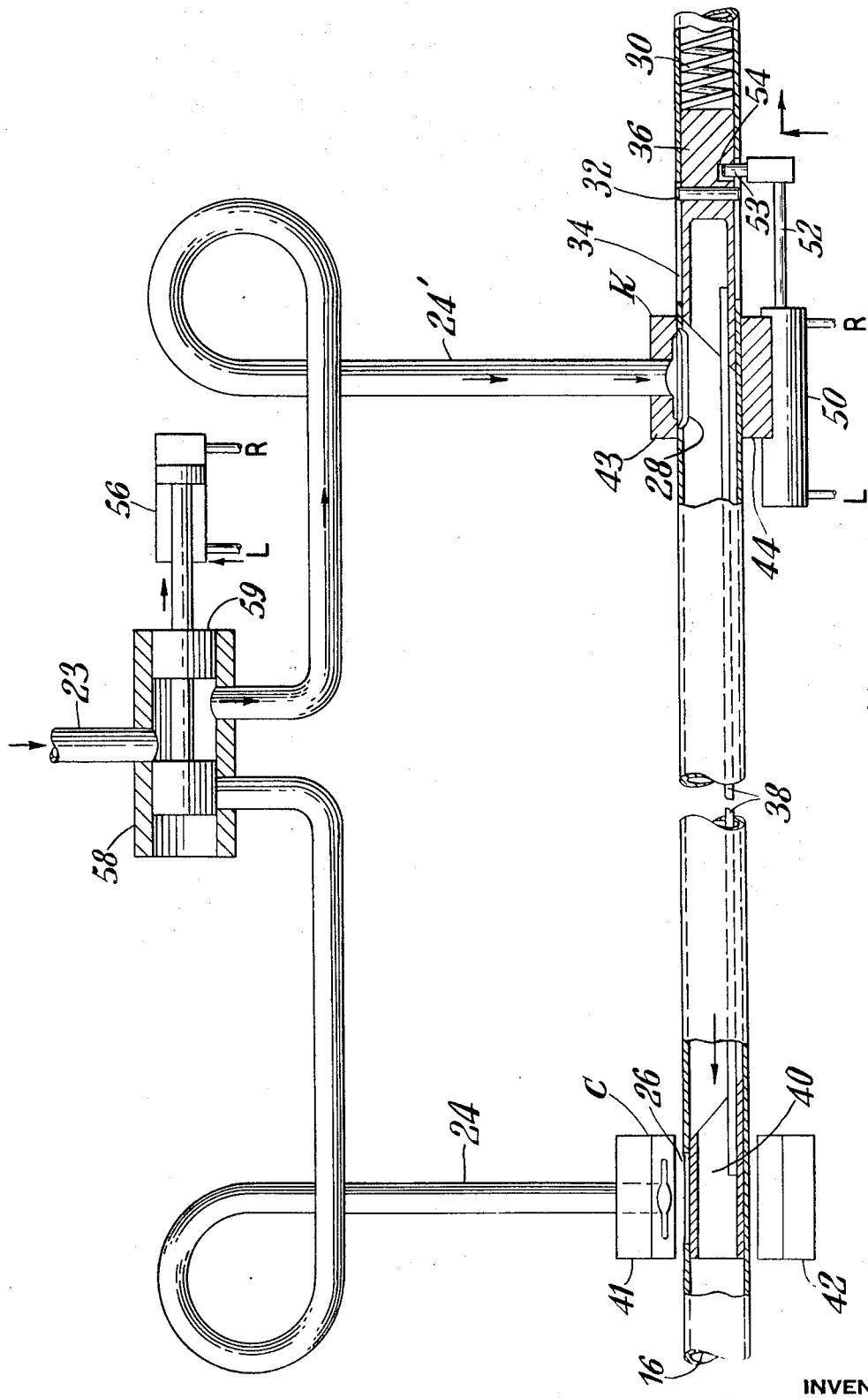

METHOD AND APPARATUS FOR PROVIDING CONSTANT INFLATION AIR

This invention relates to a novel method and apparatus for constantly supplying inflation air to and through the bore of a shirring mandrel so that a continuous length of tubular material can be kept inflated as it is advanced along and about the shirring mandrel to be shirred, compacted, severed and, subsequently, compressed.

The tubular materials to which this invention relates are those generally obtained from such materials as collagen, aliginates, starches and the like, and which most commonly serve as food casings or as molds, containers and wrappings for food products stuffed and processed therein.

A typical operation for producing continuous lengths of tubular food casings includes extruding a food casing material into a continuous, tubular length; conveying the food casing through a series of liquid treatment baths; drying and sizing the food casing; and then continuously shirring, compacting, severing and compressing the food casing to obtain relatively short and compact lengths of food casings commonly referred to in the art as "shirred casing sticks."

Processing thin-walled food casings, such as those obtained from collagen, is a delicate operation since freshly extruded collagenous tubing is very fragile, weak and porous. As a result, many problems are encountered in processing thin-walled collagenous tubing. For example, due to the porosity of collagenous tubing, the well-known "bubble method" cannot be employed to inflate it. Consequently, an inflating gas must be continuously supplied to the collagenous tubing in order to keep it inflated and the drying, sizing and shirring operations are generally performed as a continuous process. In such continuous processes, the inflating gas, such as air, is usually supplied from a hollow shirring mandrel. However, since freshly extruded and wet collagenous tubing is weak and fragile, the inflating air pressure is kept very low.

In the art of producing shirred cellulosic food casing sticks, it is well known to supply inflating air from a hollow shirring mandrel to the tubular cellulose in order to impart to the wall of the tubular cellulose that degree of rigidity and stiffness which will enable it to be advanced over the shirring mandrel and permit the shirring members to grip the advancing tubing and form pleats therein. However, since cellulosic tubing is quite strong and not as porous as tubular collagen, the manufacturing process can be intermittent. Consequently, the inflation air supply can be interrupted without deleteriously affecting the shirring process or the tubular cellulose.

On the other hand, continuous processing of tubular collagenous casing through the sizing, drying, and shirring steps require that it be continuously inflated due to the porosity of the collagenous tubing. Consequently, the inflating gas must be continuously supplied and, because the tubular collagen is of a fragile and delicate nature, is delivered to the tubular collagen at a uniform and constant pressure which is on the order of from about 0.7 to 1.6 inches water.

The continuous supply of inflating air is typically supplied to collagenous tubing from a floating, hollow mandrel used in the process. The doffing of a finished casing stick from the floating mandrel requires alternate gripping of the mandrel by a plurality of removable clamping means. This enables a severed casing length to be advanced and passed successively through the removable clamps while the mandrel is maintained in a fixed position with respect to the shirring passage.

In noncontinuous shirring of cellulosic tubing, the inflation air can be alternately supplied to the mandrel through one of the two removable gripping clamps which are provided with a passage mating with a port in the hollow mandrel wall. No attempt is made to maintain inflation air in the tubing during the severing and transporting of the cellulosic casing stick from the zone of shirring.

Prior attempts to provide an uninterrupted, continuous and uniform supply of inflation air to tubular collagen as it is being processed have not been entirely successful or economical. For example, as the tubular collagen is advanced from one processing step to another, such as after being shirred, compacted and severed, presently utilized apparatus requires that the inflation air supply be temporarily interrupted. In some instances, auxiliary sources of inflation air have been provided to temporarily supply inflation air when the main source of inflation air has been interrupted. While operable, these methods and apparatus are generally complex, do not provide a constant and positive supply of inflation air, are costly and not entirely reliable.

It is an object of this invention to provide a simple, economical and reliable method and apparatus for positively and constantly supplying inflation air, without interruption, to continuous lengths of tubular material as these lengths are advanced to be shirred on a shirring apparatus.

This and further objects of the invention will become more apparent from the ensuing description.

It has now been found that the objects of the invention can be attained by providing a method and apparatus comprising, in general, rear and forward ports formed in a hollow shirring mandrel which ports communicate with the bore of the mandrel; a valve assembly having a rear and forward valve member, said valve assembly being adapted to be slideably housed within the shirring mandrel; means for reciprocating the valve assembly so that the rear and forward mandrel ports are alternately opened and closed; and, means for continuously supplying inflation air at a uniform and constant pressure to the alternately opened rear and forward mandrel ports.

The invention will be more fully comprehended when considered together with the accompanying drawing wherein:

FIG. 1a is a schematic view of one embodiment of a electropneumatic circuit that can be employed to operate the apparatus of the invention;

FIG. 2 is an enlarged, fragmented view, part in phantom, of the mandrel in the apparatus shown in FIG. 1;

FIG. 3 is an enlarged, fragmented view, part in phantom, of the mandrel shown in FIG. 2 rotated 90°;

FIG. 4 is a cross-sectional view taken through line 4-4 of FIG. 3;

FIG. 5 is a cross-sectional view taken through line 5-5 of FIG. 3; and

FIGS. 6 and 7 are enlarged, fragmented side views, part in section, schematically illustrating sequential operation of the components comprising the apparatus of the invention.

Figure 1:
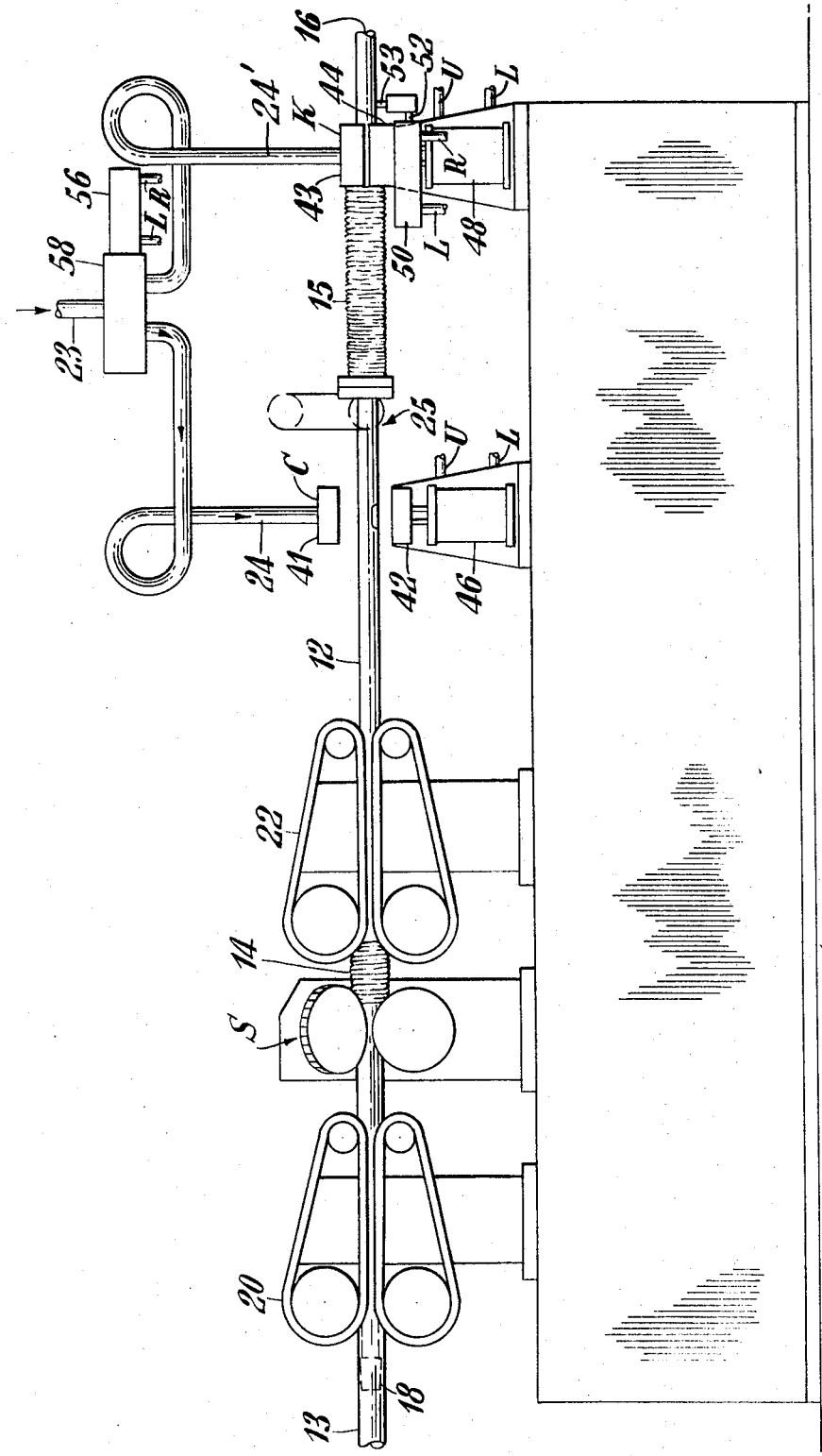
FIG. 1 is a schematic side elevational view of a shirring machine embodying the apparatus of the invention.

Turning now to the drawing, there is shown in FIG. 1 a shirring machine generally denoted by reference numeral 10. Shirring machine 10 comprises a hollow, floating mandrel 12 which is horizontally disposed and positioned to pass centrally through a shirring means S.

Shirring means S can be the same as or similar to the type disclosed and described in U.S. Pat. 2,983,949 to Matecki. As shown in this patent, the shirring means comprises a plurality of cogged wheels axially aligned about the circumference of a shirring mandrel. In operation, these cogged wheels act to axially engage and then pleat, concurrently shirr and compact, and then advance a length of tubular material which is subsequently severed and compressed into shirred casing sticks.

Floating mandrel 12 is maintained in its horizontally disposed and centrally aligned position in shirring means S by means of a pair of spaced-apart, alternately actuated, removable clamps identified by letters C and K. Clamp C is provided with a pair of hinged gripping jaws 41, 42 which serve to secure mandrel 12 in clamp C. Clamp K is also provided with gripping jaws 43, 44 to similarly secure the mandrel 12 to clamp K. Jaws 41, 42 of clamp C are actuated by pneumatic cylinder 46 while jaws 43, 44 of clamp K are actuated by pneumatic cylinder 48. A double acting pneumatic cylinder 50 is also secured to jaw 44 of clamp K and has a shifter pin 53 secured to the end of its piston rod 52.

An inflated length of dried and sized tubular collagen 13 is advanced over and along mandrel 12 by feed means 20 which is positioned forward of shirring means S. Feed means 20 is similar to that disclosed and described in copending application Ser. No. 719,567 filed Apr. 8, 1968 and comprises a pair of driven belts aligned to engage the inflated length of tubular collagen 13 and advance it toward the shirring means S. Mandrel 12 is aligned so that its tip 18 is positioned in advance of the feed means 20.

A holdback means 22 is positioned on the other side of shirring means S. Holdback means 22 is also similar to that disclosed and described in the above-identified copending application and comprises a pair of driven belts which are generally advanced in the same direction as the advance of tubular collagen 14. The belts comprising the holdback means 22 act to impart a continuous retarding force to the tubular collagen 14 as it is advanced along and about mandrel 12. A shirred and compacted section of tubular collagen is denoted by reference numeral 14 while reference numeral 15 denotes a shirred and severed portion of tubular collagen.

In FIG. 1, reference numeral 23 denotes a conduit which is connected at one end to a source of low pressure air (not shown) and at its other end to an inflation air valve 58. Reference numerals 24, 24' denote flexible conduits respectively connecting clamps C and K to inflation air valve 58.

Mounted adjacent inflation air valve 58 in a pilot cylinder 56 which is connected by means of conduits from its left and right ports, designated by letters L and R, respectively, to a master air valve 55 shown in FIG. 1a. Inflation air valve 58 is provided internally with a valve spool piston 59 as is illustrated in FIGS. 6 and 7.

One embodiment of an electropneumatic circuitry which can be utilized to actuate the apparatus of the invention is schematically illustrated in FIG. 1a. As shown in FIG. 1a, the master air valve 55 is provided with a pair of double acting solenoids 57 and has a port connected to a source of high pressure air supply (not shown) which is generally on the order of about 80 p.s.i. High pressure air is supplied from master air valve 55 to the upper and lower ports, indicated by letters U and L, respectively, of pneumatic cylinders 46 and 48 and to the left and right ports, indicated by letters L and R, respectively, of double acting pneumatic cylinder 50 and pilot cylinder 56. In FIG. 1a, reference numerals 60, 62 and 64 denote conventional air flow control valves.

The valve assembly of the apparatus of the invention is positioned within the bore 16 of mandrel 12 between clamps C and K and its location with respect to the other components of the apparatus is generally indicated in FIG. 1 by reference numeral 25.

The valve assembly 25 of the apparatus, the pertinent portions of the mandrel 12, and the double acting pneumatic cylinder 50 are shown in more detail in FIGS. 2—5. As illustrated in FIGS. 2—5, the valve assembly 25 comprises a solid, cylindrical rear valve member 36 and a tubular, hollow, cylindrical forward valve member 40 which members are linked to each other within the bore 16 of mandrel 12 by means of connecting arm 38. Rear valve member 36 and forward valve member 40 are each fabricated so that they can be freely slideably moved within the bore 16 of mandrel 12 with a minimum of clearance between their outer circumferences and the inner circumference of the bore 16 of mandrel 12. Rear valve member 36 is positioned so that a rear port 28 formed in mandrel 12 is normally closed while forward valve member 40 is positioned so that a forward port 26 formed in mandrel 12 is normally open (FIG. 3). Forward mandrel port 26 and rear mandrel port 28 are each formed and positioned in mandrel 12 so that they also communicate with passages formed internally in clamps C and K, respectively (not shown). The internally formed passages in clamps C and K provide the means through which mandrel ports 26 and 28 communicate with conduits 24 and 24' respectively (FIG. 1).

A compression spring 30 is positioned in bore 16 of mandrel 12 aft of rear valve member 36 and serves to constantly urge the valve assembly 25 toward clamp C. A pin 32 is provided in a slot 34 formed in mandrel 12 aft of rear mandrel port 28 and serves to limit the advance of the valve assembly 25 toward clamp C by compression spring 30. A slot 54 is formed in rear valve member 36 and is positioned to engage the shifter pin 53 mounted on the end of the piston rod 52 of double acting pneumatic cylinder 50 (FIGS. 1, 6 and 7).

A typical operation of the apparatus of the invention is set forth hereinbelow and will be more completely understood when considered together with the accompanying drawing.

A continuous length of tubular collagen 13 is advanced over mandrel 12 by feed means 20 and then shirred by shirring means S and compacted by holdback means 22. Inflation air at a uniform and constant pressure of from about 0.7 to 1.6 inches water is continuously supplied to the tubular collagen 13 through the tip 18 of mandrel 12 (FIG. 1). During this time, clamp C is closed, clamp K is open and the valve assembly 25 is urged toward clamp C by compression spring 30. Under this condition, forward valve member 40 is positioned beyond forward mandrel port 26 so that it is open and rear valve member 36 has closed rear mandrel port 28 (FIG. 6).

Clamp C is closed and clamp K is open when master air valve 55 (FIG. 1a) serves to pressurize lower port L and exhaust upper port U of pneumatic cylinder 46 to secure mandrel 12 in clamp C. After a slight time delay provided by conventional air flow control valves, upper port U of pneumatic cylinder 48 is pressurized and its lower port L is exhausted thereby opening clamp K. At this time master air valve 55 also serves to pressurize the right port R and exhaust the left port L of pilot cylinder 56 so that the valve spool piston 59 in inflation air valve 58 is positioned to the left (FIG. 6). In this condition, low pressure inflation air is admitted from conduit 23 through conduit 24, to and through the internal passage in clamp C, thence through front mandrel port 26, into and through the bore 16 of mandrel 12 and front valve member 40 and then to and through mandrel tip 18 to continuously inflate a continuous length of tubular collagen 13 (FIG. 6). The inflation air is prevented from escaping out of the bore 16 of mandrel 12 through rear mandrel port 28 since rear mandrel port 28 is closed off by means of rear valve member 36 (FIG. 6).

During this time, a severed, compacted length of tubular collagen 15 (FIG. 1) can be advanced through open clamp K and be subsequently doffed from the mandrel 12 while a succeeding length of tubular collagen 14 is being shirred and compacted. In order to advance the next, succeeding length of shirred and compacted tubular collagen 14, clamp C must be opened and clamp K must be closed to maintain the mandrel 12 in its operating position. This must be accomplished by first closing clamp K to fully grip the mandrel 12 prior to the opening of clamp C without interrupting the supply of low pressure inflation air to the continuous length of tubular collagen 13 so that it will remain inflated as it is being advanced along and about mandrel 12.

To accomplish this, the condition of master air valve 55 (FIG. 1a) is reversed by energizing the double acting solenoid 57 which exhausts upper port U and pressurizes lower port L of pneumatic cylinder 48 thereby closing clamp K. Master air valve 55 also pressurizes upper port U and, after an appropriate time delay provided by conventional exhaust air control valve 60, exhausts lower port L of pneumatic cylinder 46 to open clamp C (FIG. 7). In this manner, mandrel 12 is maintained in its operating position. At the same time, master air valve 55 (FIG. 1a) serves to pressurize left port L and exhaust right port R of pilot cylinder 56 causing valve spool piston 59 in inflation air valve 58 to move to the right (FIG. 7).

Clamp K has pneumatic cylinder 50 secured to one jaw and, when clamp K is closed to grip mandrel 12, the shifter pin 53 secured to the end of (retracted) piston rod 52 engages slot 54 in rear valve member 36 (FIG. 1). When master air valve 55 (FIG. 1a) is conditioned to pressurize cylinders 46, 48, 56 as described above, it also serves to pressurize left port L and exhaust right port R of double acting pneumatic cylinder 50.

After an appropriate time delay provided by conventional exhaust air flow control valve 64, pneumatic cylinder 50 actuates to advance piston rod 52 so that the shifter pin 53 engaged in slot 54 of rear valve member 36 (FIG. 7) urges the valve assembly 25 toward clamp K, whereupon forward valve member 40 closes forward mandrel port 26 and rear valve member 36 exposes rear mandrel port 28 (FIG. 7). At this time, low pressure inflation air is admitted from conduit 23 through conduit 24', to and through the internal passage of clamp K thence through rear mandrel port 28 into and through the bore 16 of mandrel 12, and then through forward valve member 40 and the mandrel tip 18 into the continuous length of tubular collagen 13. As a result, low pressure inflation air is continuously supplied to the constantly advancing tubular collagen 13 without interruption.

In order to doff the severed and compacted portion of tubular collagen 15 (FIG. 1) from the mandrel 12, the components of the apparatus must be restored to their respective positions as shown in FIG. 6. Master air valve 55 (FIG. 1a) is again reversed by energizing the double acting solenoid 57 which pressurizes lower port L and exhausts upper port U of pneumatic cylinder 46 thereby closing clamp C. Master air valve 55 also pressurizes upper port U and after an appropriate time delay provided by conventional exhaust air control valve 62, exhausts lower port L of pneumatic cylinder 48 thereby opening clamp K. When clamp K opens, shifter pin 53 is disengaged from slot 54 of rear valve member 36. At the same time, master air valve 55 serves to pressurize the right port R of pilot cylinder 56 and exhaust its left port L thereby moving the valve spool piston 59 in inflation air valve 58 to the right. Concurrently, left port L of double acting pneumatic cylinder 50 is exhausted while its right port R is pressurized thereby retracting piston rod 52 and shifter pin 53 to restore them into position as shown in FIG. 6. As clamp K opens and shifter pin 53 is disengaged from slot 54 as described above, the compression spring 30 of rear valve member 36 is free to again urge the valve assembly 25 toward the front of mandrel 12. Consequently, low pressure inflation air is constantly supplied to the continuous length of tubular collagen 13 through conduits 23 and 24, the internal passage in clamp C, and the forward mandrel port 26 since the forward valve member 40 is now in advance of the forward mandrel port 26 thereby exposing it to the mandrel bore 16 while the valve member 36 has closed the rear mandrel port 28 to prevent inflation air from escaping from it (FIG. 6).

The electropneumatic circuitry described above thus operates to maintain mandrel 12 in its operating position during the opening and closing of clamps C and K and to provide constant casing inflation air through conduits 24 or 24', and thence through an appropriately closed clamp and opened port of mandrel 12 to the advancing casing 13. Time delay means to provide overlapping gripping of the mandrel 12 by a closing clamp before release of the mandrel by the opening clamp, is afforded by conventional air flow control valves 60, 62 which are adapted to control and delay the exhausting of the opening clamp pneumatic cylinder. Conventional air flow control valve 64 serves as a time delay to control the retracting of shifter pin 53 until it has been disengaged from slot 54 of rear valve member 36 as clamp K opens.

Although the invention has been described in some detail with particular reference to tubular collagen and the apparatus employed to fabricate it into shirred casing sticks, it should be understood that the apparatus of the invention can also be utilized to supply a constant source of gas, air or other materials in other continuous processes. Hence, it should be further understood that changes, modifications and alterations can be made in the invention without departing from the scope and spirit of the invention.

We claim:
1. An apparatus for constantly and continuously supplying inflation air to a continuous length of constantly advancing tubular material comprising, in combination;
   a. a hollow mandrel having an internal bore therethrough and floating support means;
   b. a rear mandrel port and a forward mandrel port formed in said mandrel in a spaced-apart relationship from each other, said rear and forward mandrel ports each communicating with the internal bore of said mandrel;
   c. a valve assembly slideably positioned within the bore of said mandrel;
   d. means for reciprocating said valve assembly such that said rear and forward mandrel ports are alternately opened and closed;
   e. means for constantly advancing a continuous length of tubular material along and about said mandrel; and
   f. means for continuously and constantly supplying inflation air through said alternately opened rear and forward mandrel ports such that inflation air is continuously supplied through the bore of said mandrel into the constantly advancing continuous length of tubular material.

2. The apparatus of claim 1 wherein the valve assembly comprises, in combination;
   a. a tubular, hollow, cylindrical forward valve member;
   b. a solid, cylindrical rear valve member; and
   c. a connecting arm linking said forward and rear valve members to each other.

3. The apparatus of claim 1 wherein said rear and forward mandrel ports are alternately connected to communicate with a source of inflation air by means comprising alternately actuated clamp members each of which are provided with ports that mate with said rear and forward mandrel ports.

4. The apparatus of claim 1 wherein means are provided for alternately gripping and releasing the mandrel in an overlapping time relationship such that said mandrel is constantly maintained in its operating position.